US011938555B2

(12) United States Patent
Sato

(10) Patent No.: US 11,938,555 B2
(45) Date of Patent: Mar. 26, 2024

(54) MECHANICAL VIBRATION MACHINING APPARATUS AND MECHANICAL VIBRATION MACHINING METHOD

(71) Applicant: ULTEX CORPORATION, Fukuoka (JP)

(72) Inventor: Shigeru Sato, Fukuoka (JP)

(73) Assignee: ULTEX CORPORATION, Fukuoka (JP)

( * ) Notice: Subject to any disclaimer, the term of this patent is extended or adjusted under 35 U.S.C. 154(b) by 629 days.

(21) Appl. No.: 16/950,583

(22) Filed: Nov. 17, 2020

(65) Prior Publication Data
US 2021/0154765 A1 May 27, 2021

(30) Foreign Application Priority Data
Nov. 26, 2019 (JP) .................................. 2019-213335

(51) Int. Cl.
B23K 20/00 (2006.01)
B06B 1/02 (2006.01)
B23K 20/10 (2006.01)

(52) U.S. Cl.
CPC ............ *B23K 20/10* (2013.01); *B06B 1/0215* (2013.01); *B06B 2201/72* (2013.01)

(58) Field of Classification Search
CPC ........ B23K 20/10; B23K 20/106; B29C 65/08
See application file for complete search history.

(56) References Cited

U.S. PATENT DOCUMENTS

| 6,168,063 B1 * | 1/2001 | Sato ...................... B23K 20/10 228/49.1 |
| 6,491,785 B1 * | 12/2002 | Sato ...................... B29C 65/08 228/1.1 |
| 7,337,938 B2 * | 3/2008 | Noro ................... B29C 66/1122 228/1.1 |
| 9,751,257 B2 * | 9/2017 | Li ........................... B29C 65/08 |
| 2019/0381599 A1 | 12/2019 | Gnad et al. |

FOREIGN PATENT DOCUMENTS

| JP | 3338008 B2 | 10/2002 |
| WO | 2018189057 A1 | 10/2018 |

OTHER PUBLICATIONS

Office Action dated Oct. 26, 2022 for the corresponding Japanese application No. 2019-213335, including English translation.

* cited by examiner

*Primary Examiner* — Erin B Saad
(74) *Attorney, Agent, or Firm* — Lucas & Mercanti, LLP

(57) ABSTRACT

A mechanical vibration machining apparatus or the like is suitable for forming a stable machined surface. A mechanical vibration machining apparatus performs machining of a machining target using a horn. A control unit instructs the horn to perform a mechanical vibration operation and a rotational driving operation. The control unit controls the mechanical vibration and/or the rotational driving in a periodic manner. For example, the control unit supports intermittent alternating control. That is to say, when one from among the mechanical vibration and the rotational driving is provided, the other is suspended. Such periodic control allows the stress that occurs due to the applied force to be dispersed, thereby allowing a stable machined surface to be formed.

4 Claims, 5 Drawing Sheets

MECHANICAL VIBRATION MACHINING APPARATUS AND MECHANICAL VIBRATION MACHINING METHOD

CROSS REFERENCE TO RELATED APPLICATION

This application claims the priority of Japanese Patent Application No. 2019-213335 filed on Nov. 26, 2019, and the entire content thereof is incorporated herein by reference

Technical Field

The present invention relates to a mechanical vibration machining apparatus and a mechanical vibration machining method, and particularly to a mechanical vibration machining apparatus configured to provide machining of a machining target.

BACKGROUND ART

For example, as disclosed in Patent document 1, the present inventor has researched and developed machining using mechanical vibration such as ultrasonic vibration or the like. This process uses mechanical vibration and rotational driving of a horn arranged such that it is pressed in contact with a machining target.

CITATION LIST

Patent Literature

[Patent Document 1]
Japanese Patent No. 3,338,008

SUMMARY OF INVENTION

Technical Problem

FIGS. 5A-5C show an example of control signals for controlling mechanical vibration, rotational driving, and anvil-raising pressure, according to a conventional technique. Specifically, FIG. 5A shows graphs showing the control signals for controlling the mechanical vibration, rotational driving, and anvil-raising pressure, in this order from the top. In each graph, the horizontal axis represents time, and the vertical axis represents the on/off signal state of the control signal. With conventional techniques, the mechanical vibration, rotational driving, and anvil-raising pressure are controlled such that they are each maintained at a constant value.

However, as shown in FIG. 5B, in a case in which the mechanical vibration, rotational driving, and anvil-raising pressure are controlled such that they are each maintained at a constant value, this leads to unstable bonding. It is considered that this is because such an arrangement involves ununiform force applied such that a thick steel plate is continuously displaced over 360° of direction (a plane). As a result, as shown in FIG. 5C, due to the occurrence of a portion where force is strongly applied and a portion where force is weakly applied, it is considered that this results in an unstable bonding surface.

Accordingly, it is a purpose of the present invention to provide a mechanical vibration machining apparatus or the like suitable for forming a stable machined surface.

Solution of Problem

A first aspect of the present invention relates to a mechanical vibration machining apparatus configured to machine a machining target. The mechanical vibration machining apparatus includes: a horn arranged such that it is pressed in contact with the machining target; and a control unit configured to control the horn to provide mechanical vibration and rotational driving operation so as to perform the machining. The control unit controls, in a periodic manner, the mechanical vibration and/or the rotational driving operation supported by the horn.

A second aspect of the present invention relates to the mechanical vibration machining apparatus according to the first aspect. The control unit supports the mechanical vibration of the horn controlled in a periodic manner such that a first vibration state in which mechanical vibration is provided and a second vibration state in which mechanical vibration is provided with a level that is smaller than that in the first vibration state are alternately repeated. Furthermore, the control unit supports the rotational driving operation of the horn controlled in a periodic manner such that a first rotational driving state in which rotational driving is provided and a second rotational driving state in which rotational driving is provided with a level that is smaller than that in the first rotational driving state are alternately repeated. In the machining, in a case in which the mechanical vibration supported by the horn is controlled in a periodic manner, the control unit instructs the horn to perform the rotational driving operation at least in a part of or all of the second vibration state. In the machining, in a case in which the rotational driving operation supported by the horn is controlled in a periodic manner, the control unit instructs the horn to perform the mechanical vibration operation at least in a part of or all of the second rotational driving state.

A third aspect of the present invention relates to the mechanical vibration machining apparatus according to the second aspect. In the machining, in a case in which the mechanical vibration and the rotational driving operation supported by the horn are controlled in a periodic manner, the control unit sets the horn to the first vibration state during a part of or all of the second rotational driving state so as to provide machining by mechanical vibration in the first vibration state in a state in which the horn is rotationally driven with a small level. Furthermore, the control unit sets the horn to the first rotational driving state during a part of or all of the second vibration state so as to provide the rotational driving operation in the first rotational driving state in a state in which the horn is mechanically vibrated with a small level.

A fourth aspect of the present invention relates to the mechanical vibration machining apparatus according to the second or third aspect. In the second vibration state, no mechanical vibration is provided. Furthermore, in the second rotational driving state, no rotational driving is provided.

A fifth aspect of the present invention relates to a mechanical vibration machining method for machining a machining target. The mechanical vibration machining method includes: machining in which a control unit instructs a horn that is pressed in contact with the machining target to perform a mechanical vibration operation and a rotational driving operation so as to provide the machining. In the machining, the control unit controls, in a periodic manner, the mechanical vibration and/or the rotational driving operation supported by the horn.

A sixth aspect of the present invention relates to the mechanical vibration machining method according to the fifth aspect. The control unit supports the mechanical vibration of the horn controlled in a periodic manner such that a first vibration state in which mechanical vibration is provided and a second vibration state in which mechanical vibration is provided with a level that is smaller than that in the first vibration state are alternately repeated. The control unit supports the rotational driving operation of the horn controlled in a periodic manner such that a first rotational driving state in which rotational driving is provided and a second rotational driving state in which rotational driving is provided with a level that is smaller than that in the first rotational driving state are alternately repeated. In the machining, in a case in which the mechanical vibration supported by the horn is controlled in a periodic manner, the control unit instructs the horn to perform the rotational driving operation at least in a part of or all of the second vibration state. In the machining, in a case in which the rotational driving operation supported by the horn is controlled in a periodic manner, the control unit instructs the horn to perform the mechanical vibration operation at least in a part of or all of the second rotational driving state.

Advantageous Effects of Invention

With each aspect of the present invention, at least one from among the mechanical vibration (ultrasound vibration of 20 kHz or more, sound vibration at a frequency that is lower than 20 kHz, etc.) and the rotational driving is controlled in a periodic manner. Such periodic control allows the stress that occurs due to the applied force to be dispersed, thereby allowing a stable machined surface to be formed.

DESCRIPTION OF EMBODIMENTS

Description will be made with reference to the drawings regarding an example of the present invention. It should be noted that an embodiment of the present invention is not restricted to the following example.

EXAMPLE

Figure 1A:
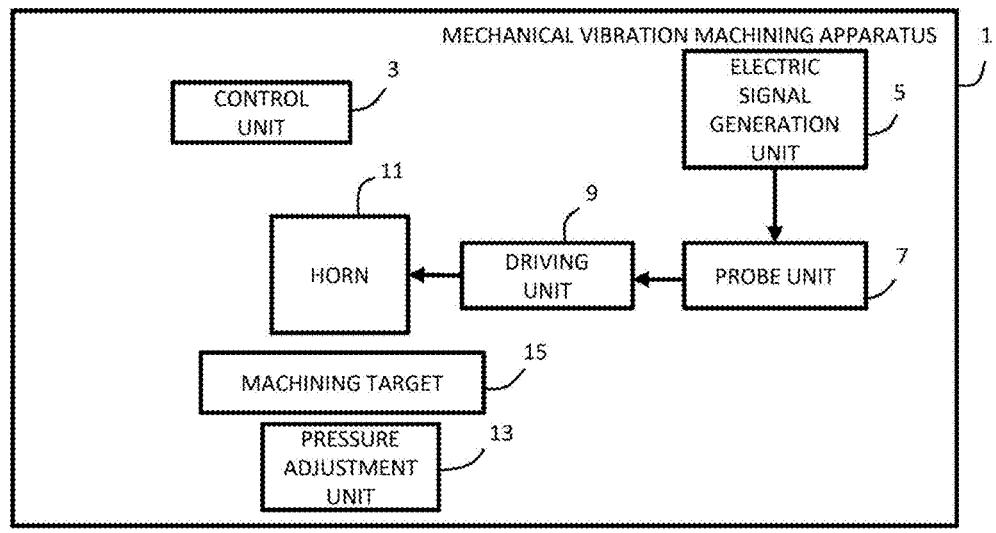
FIG. 1A is a block diagram showing an example configuration of a mechanical vibration machining apparatus 1 according to an embodiment of the present invention.
Figure 1B:
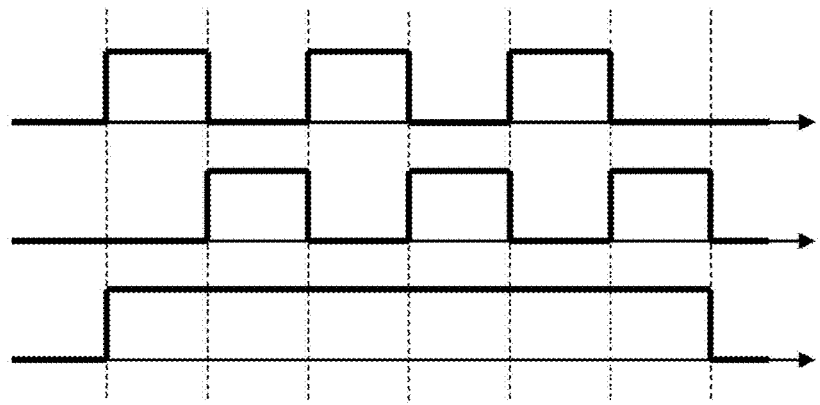
FIG. 1B is a graph showing an example of control signals.
Figure 1C:
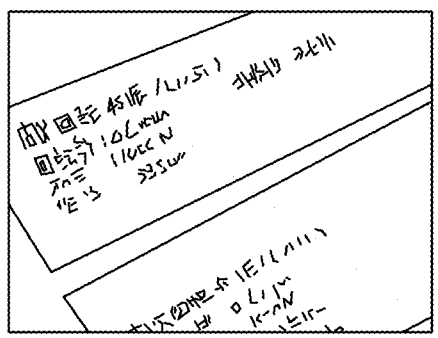
FIG. 1C is a diagram showing an example of a bonding surface.
Figure 1D:
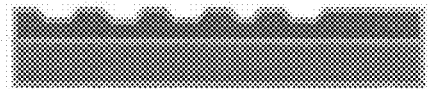
FIG. 1D is a diagram showing an example of a bonding surface.

FIG. 1A is a block diagram showing an example configuration of a mechanical vibration machining apparatus 1 according to an embodiment of the present invention. FIG. 1B is a graph showing an example of control signals. FIGS. 1C and 1D are diagrams each showing an example of a bonding surface.

FIG. 1A is a block diagram showing an example of a configuration of the mechanical vibration machining apparatus 1 according to an embodiment of the present invention. Examples of mechanical vibration include sound vibration, which is mechanical vibration at a frequency that is lower than 20 kHz, and ultrasound vibration, which is mechanical vibration at a frequency of 20 kHz or more.

Referring to FIG. 1A, the mechanical vibration machining apparatus 1 includes a control unit 3 (an example of a "control unit" in the present claims), an electric signal generation unit 5, a probe unit 7, a driving unit 9, a horn 11 (an example of a "horn" in the present claims), and a pressure adjustment unit 13.

The control unit 3 controls the operations of the probe unit 7, the driving unit 9, and the pressure adjustment unit 13 using a mechanical vibration control signal, a rotational driving control signal, and an anvil-raising pressure control signal, respectively. For example, each of the probe unit 7, the driving unit 9, and the pressure adjustment unit 13 operates when the corresponding control signal is set to the on state. Conversely, each of the probe unit 7, the driving unit 9, and the pressure adjustment unit 13 does not operates when the corresponding control signal is set to the off state.

The electric signal generation unit 5 generates an electric signal. The probe unit 7 converts the electric signal generated by the electric signal generation unit 5 into mechanical vibration.

The driving unit 9 rotationally drives the horn 11 in a state in which the horn 11 is supported on both ends. The mechanical vibration converted by the probe unit 7 is transmitted to the horn 11 via the driving unit 9.

The horn 11 is directly pressed in contact with a machining target 15, so as to provide machining (bonding, welding, etc.).

The horn 11 and the pressure adjustment unit 13 are arranged such that the machining target 15 is interposed between them and such that the machining target 15 is pressed from above by the horn 11 and is pressed from below by the pressure adjustment unit 13. The pressure adjustment unit 13 is raised according to the control signal received from the control unit 3 so as to adjust the pressure applied between the horn 11 and the machining target 15. It should be noted that the pressure adjustment unit 13 may be configured to drive the anvil (holding jig) in synchronization with the driving operation of the horn 11.

Figure 2A:
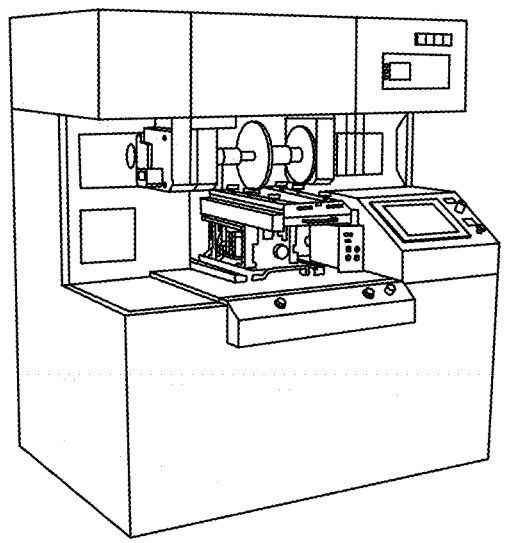
FIG. 2A is a diagram showing an overall configuration of an actual example of the mechanical vibration machining apparatus 1 shown in FIG. 1A.
Figure 2B:
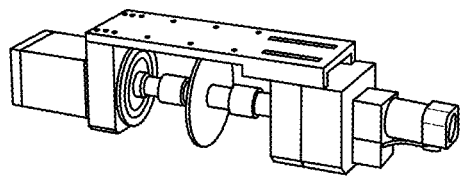
FIG. 2B a diagram showing a portion of the actuator shown in FIG. 2A.

FIGS. 2A-2E are a diagram for explaining an actual example of the mechanical vibration machining apparatus 1 shown in FIG. 1A. FIG. 2A shows an overall configuration of the actual apparatus. FIG. 2B shows a portion of the actuator shown in FIG. 2A.

Figure 2C:
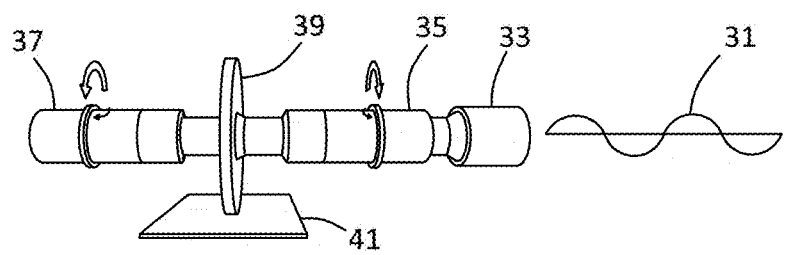
FIG. 2C is a diagram showing a schematic configuration of a sound rotary system.

FIG. 2C is a diagram showing a schematic configuration of a sound rotary system. A horn 39 is vibrated in a horizontal vibration mode (horizonal direction) or a vertical vibration mode (radial direction). The horn 39 thus vibrated transmits sound energy to parts 41 while rotating the horn 39. Such an arrangement provides continuous bonding of metal workpieces or continuous welding of resin workpieces. In an example shown in FIG. 2C, an electric signal 31, a transducer 33, boosters 35 and 37, a horn 39, and parts 41 correspond to an electric signal generated by the electric signal generation unit 5, the probe unit 7, the driving unit 9, the horn 11, and the machining target 15, shown in FIG. 1A, respectively.

Figure 2D:
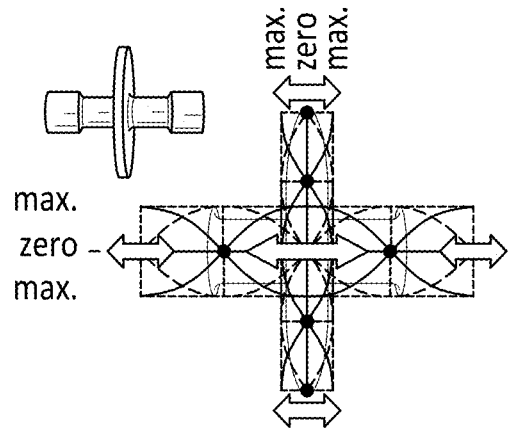
FIG. 2D is a diagram for explaining a horizontal vibration.
Figure 2E:
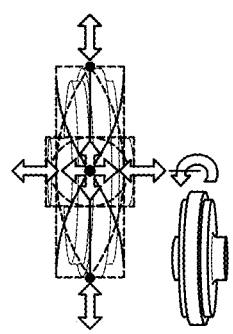
FIG. 2E is a diagram for explaining a vertical vibration.

FIGS. 2D and 2E are diagrams for explaining the horizontal vibration and the vertical vibration, respectively. The vibration mode supported by the horn 11 changes depending on the shape of the horn. Examples of such vibration modes include the horizontal vibration mode and the vertical vibration mode. In the horizontal vibration mode, the horn is vibrated with a given wavelength as its base. In this mode, the vibration propagates as horizontal vibration parallel to the horizontal direction with the center of vibration propagation as the center of the horn, which functions as the maximum vibration amplitude point. The horizontal vibration mode is mainly used for sound metal bonding. On the other hand, in the vertical vibration mode, the horn is vibrated with a given half wavelength as its base. In this mode, the amplitude of the vibration is distributed to radial directions with the center of vibration propagation as the center of the horn, which functions as the maximum stress point, thereby providing vertical vibration. The vertical vibration mode is mainly used for sound resin welding.

FIG. 1B is a graph showing an example of the mechanical vibration control signal, the rotational driving control signal, and the anvil-raising pressure control signal. Specifically, FIG. 1B is a graph showing the mechanical vibration control signal, the rotational driving control signal, and the anvil-raising pressure control signal in this order from the top. In each graph, the horizontal axis represents time, and the vertical axis represents the state of the on/off signal of the corresponding control signal. Specifically, when the control signal is on the horizontal axis, this represents the off state. Conversely, when there is a difference between the control signal and the horizontal axis, this represents the on state. The degree of difference between the control signal and the horizontal axis represents the strength of the control operation.

The mechanical vibration control signal is switched between the on state and the off state in a periodic manner. When the mechanical vibration control signal is set to the on state, the probe unit 7 converts the electric signal into mechanical vibration so as to mechanically vibrate the horn 11 (an example of a "first vibration state" in the present claims). Conversely, when the mechanical vibration control signal is set to the off state, the probe unit 7 does not convert the electric signal into mechanical vibration, thereby providing no mechanical vibration to the horn 11 (an example of a "second vibration state" in the present claims).

The rotational driving control signal is switched between the on state and the off state in a periodic manner. When the rotational driving control signal is set to the on state, the driving unit 9 rotationally drives the horn 11 (an example of a "first rotational driving state" in the present claims). Conversely, when the rotational driving control signal is set to the off state, the driving unit 9 does not rotationally drive the horn 11 (an example of a "second rotational driving state" in the present claims).

The anvil-raising pressure control signal is maintained at a constant value during the processing.

In this example, the mechanical vibration control signal and the rotational driving control signal are controlled such that their on/off states are switched in a alternating manner, i.e., such that, when one from among the mechanical vibration control signal and the rotational driving control signal is set to the on state, the other signal is set to the off state (intermittent alternating control). It should be noted that it is not strictly necessary for the on/off states of the mechanical vibration control signal and the rotational driving control signal to be controlled such that when one is in the on state, the other is in the off state. That is to say, such an on/off control operation may include a state in which both the mechanical vibration control signal and the rotational driving control signal are set to the off state.

FIG. 1C shows a result obtained by machining processing in which the mechanical vibration control signal and the rotational driving control signal are on/off controlled in an alternating manner. FIG. 1D is a cross-sectional diagram showing a schematic shape of the result. As shown in FIG. 1C, such an arrangement provides a stable bonding surface. As shown in FIG. 1D, in a case in which an on/off control operation is performed in an alternating manner, by making use of the off state to disperse unevenness in the force, this arrangement is able to provide a stable machined surface.

Figure 3A:
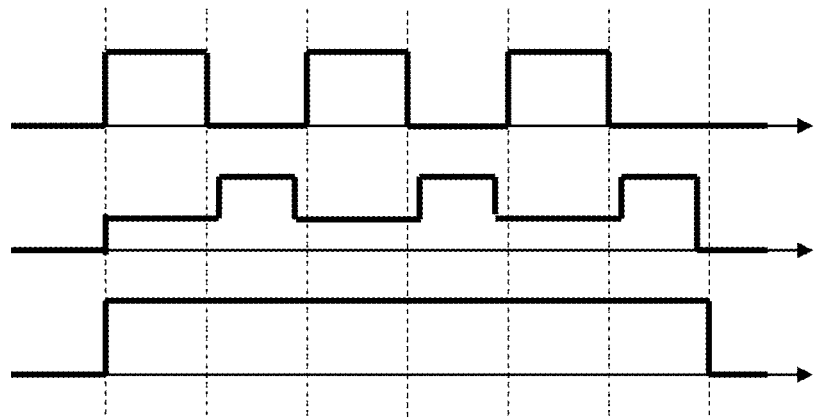
FIG. 3A is a graph showing an example of control signals according to another embodiment in which the mechanical vibration control signal is switched between the on state and the off state in a periodic manner.
Figure 3B:
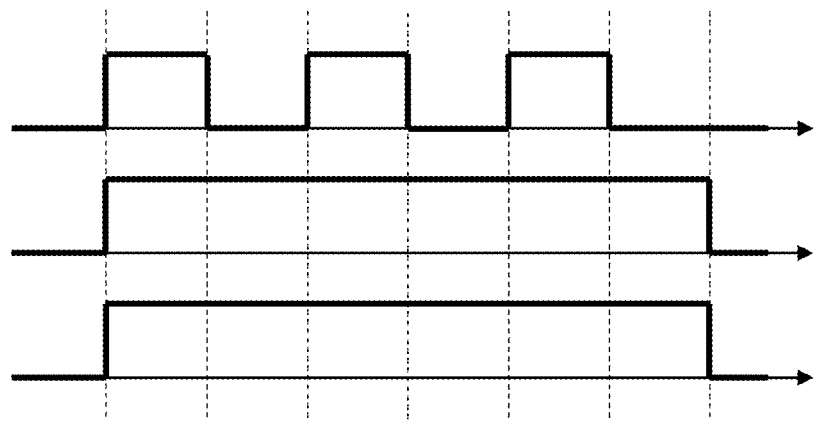
FIG. 3B is a graph showing an example of control signals according to another embodiment in which only the mechanical vibration control signal is switched between the on state and the off state in a periodic manner, and the rotational driving control signal is fixed to the on state.
Figure 3C:
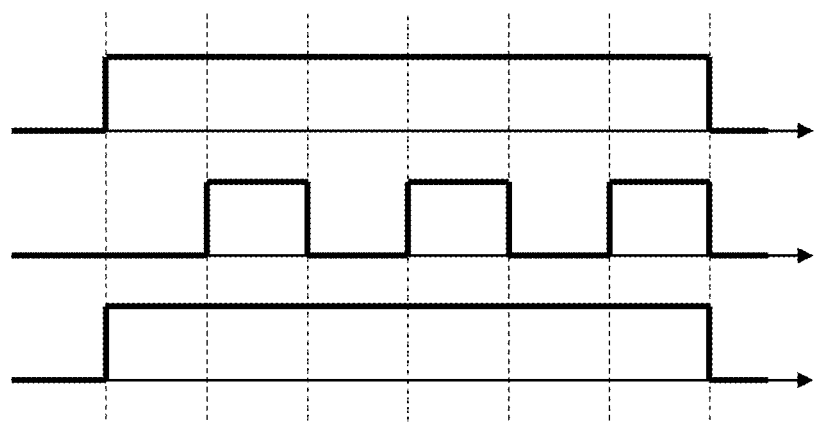
FIG. 3C is a graph showing an example of control signals according to another embodiment in which only the rotational driving control signal is switched between the on state and the off state in a periodic manner, and the mechanical vibration control signal is fixed to the on state.

FIGS. 3A-3C are graphs showing examples of control signals according to another embodiment. The graphs each show the mechanical vibration control signal, the rotational driving control signal, and the anvil-raising pressure control signal in this order from the top. In each graph, the horizontal axis represents time. The vertical axis represents the state of the on/off signal of the corresponding control signal. Specifically, when the control signal is on the horizontal axis, this represents the off state. Conversely, when there is a difference between the control signal and the horizontal axis, this represents the on state. The degree of difference between the control signal and the horizontal axis represents the strength of the control operation.

For example, as shown in FIG. 3A, the mechanical vibration control signal and the rotational driving control signal may be controlled such that one from among them is switched between the on state and the off state in a periodic manner, and such that the other one from among them is maintained in the on state in which the strength of the control operation is changed in a periodic manner. Specifically, FIG. 3A shows an example in which the mechanical vibration control signal is switched between the on state and the off state in a periodic manner. When the mechanical vibration control signal is set to the on state, the rotational driving control signal is controlled so as to reduce the rotational driving force in order to reduce the stress of force. On the other hand, when the mechanical vibration control signal is set to the off state, the rotational driving control signal is controlled so as to raise the rotational driving force. This allows the horn 11 to be largely moved in a state in which only a small stress of force is applied.

For example, as shown in FIG. 3B, an arrangement may also be made in which only the mechanical vibration control signal is switched between the on state and the off state in a periodic manner, and the rotational driving control signal is fixed to the on state. By making use of the off state of the mechanical vibration control signal, such an arrangement allows the stress of force to be dispersed.

For example, as shown in FIG. 3C, an arrangement may also be made in which only the rotational driving control signal is switched between the on state and the off state in a periodic manner, and the mechanical vibration control signal is fixed to the on state. By making use of the off state of the rotational driving control signal, such an arrangement allows the stress of force to be dispersed.

Figure 4:
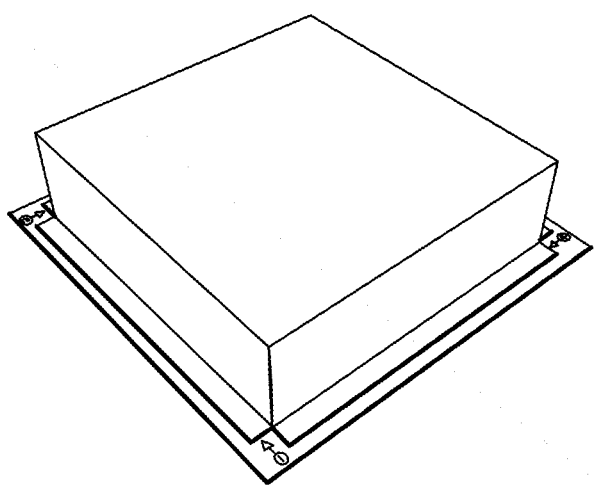
FIG. 4 shows a result obtained by continuous seam welding of four sides of a galvanized steel plate using mechanical vibration of 15 kHz.
Figure 5A:
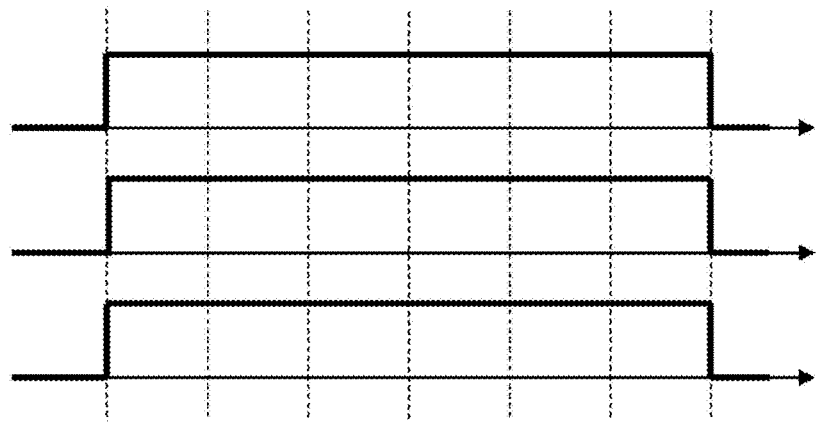
FIG. 5A is a graph showing an example of control signals according to a conventional technique.
Figure 5B:
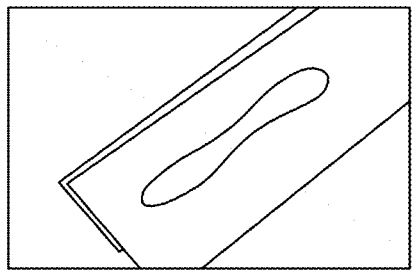
FIG. 5B is a diagram showing an example of a bonding surface.
Figure 5C:
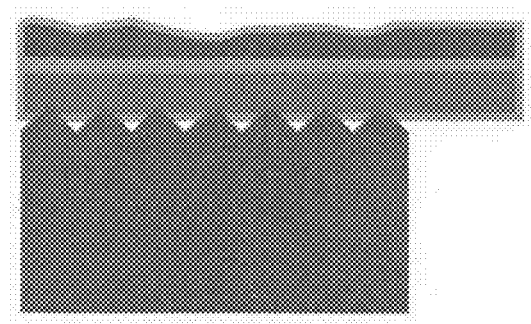
FIG. 5C is a diagram showing an example of a bonding surface.

FIG. 4 shows a result obtained by continuous seam welding of four sides of a galvanized steel plate using the intermittent alternating control operation. With resistance spot welding of a galvanized steel plate, after such spot welding is continuously repeated a certain number of times, such an arrangement is not able to provide a so-called nugget, which is a welded portion between joint plates or plates. It has been known that, in a case in which resistance spot welding is employed for a galvanized steel plate, this allows such spot welding to be continuously repeated only a very small number of times (for example, see Kondo et al., "Degradation mechanism of electrode tip during resistance spot welding of zinc-coated galvannealed steel sheets", Journal of the Japan Welding Society, Vol. 27, No. 3, pp. 230-239, 2009).

As can be understood from such a result shown in FIG. 4, such an arrangement is capable of obtaining continuous seam welding of a galvanized steel plate by using the intermittent alternating control operation. The intermittent alternating control operation was performed for the mechanical vibration operation and the rotational driving operation. Specifically, a 1.0-sec period in which mechanical operation was performed and the rotational driving operation was suspended and a 0.5-sec period in which the rotational driving operation was performed and the mechanical vibration operation was suspended were alternately repeated. The bonding was performed with a frequency of 15 kHz, a pressure of 300 N, a rotational speed of 1.0 rpm, an amplitude of 50.0 μm, a seam length of 300 mm, and a bonding width of 5.0 mm.

Furthermore, the present inventor has confirmed by experiment that, with the present invention, this provides bonding of a wide range of metals such as aluminum, stainless steel, and high tensile strength steel (high-strength steel), and welding of resin materials.

REFERENCE SIGNS LIST

1 mechanical vibration machining apparatus, 3 control unit, 5 electric signal generation unit, 7 probe unit, 9 driving unit, 11 horn, 13 pressure adjustment unit, 31 electric signal, 33 transducer, 35, 37 booster, 39 horn, 41 parts.

The invention claimed is:

1. A mechanical vibration machining apparatus configured to machine a machining target, comprising:
    a horn arranged such that it is pressed in contact with the machining target; and
    a control unit configured to control the horn to provide mechanical vibration and rotational driving operation so as to perform the machining,
    wherein the control unit is configured to control the mechanical vibration of the horn to be provided in a periodic manner by alternately repeating a first vibration state in which a first mechanical vibration is provided and a second vibration state in which a second mechanical vibration is provided with a level that is smaller than the first mechanical vibration,
    wherein the control unit is configured to control the rotational driving operation of the horn to be provided in a periodic manner by alternately repeating a first rotational driving state in which a first rotational driving is provided and a second rotational driving state in which a second rotational driving is provided with a level that is smaller than the first rotational driving,
    wherein the control unit is configured to set the horn to the first vibration state during a part or all of the second rotational driving state, and
    wherein the control unit is configured to set the horn to the first rotational driving state during a part or all of the second vibration state.

2. The mechanical vibration machining apparatus according to claim 1, wherein, in the second vibration state, the control unit is configured to control the horn to provide no mechanical vibration,
    and wherein, in the second rotational driving state, the control unit is configured to control the horn to provide no rotational driving.

3. The mechanical vibration machining apparatus according to claim 1, wherein the machining target includes metal workpieces, and wherein the horn bonds the metal workpieces.

4. The mechanical vibration machining apparatus according to claim 1, wherein the machining target includes resin workpieces, and wherein the horn welds the resin workpieces.

* * * * *